UNITED STATES PATENT OFFICE.

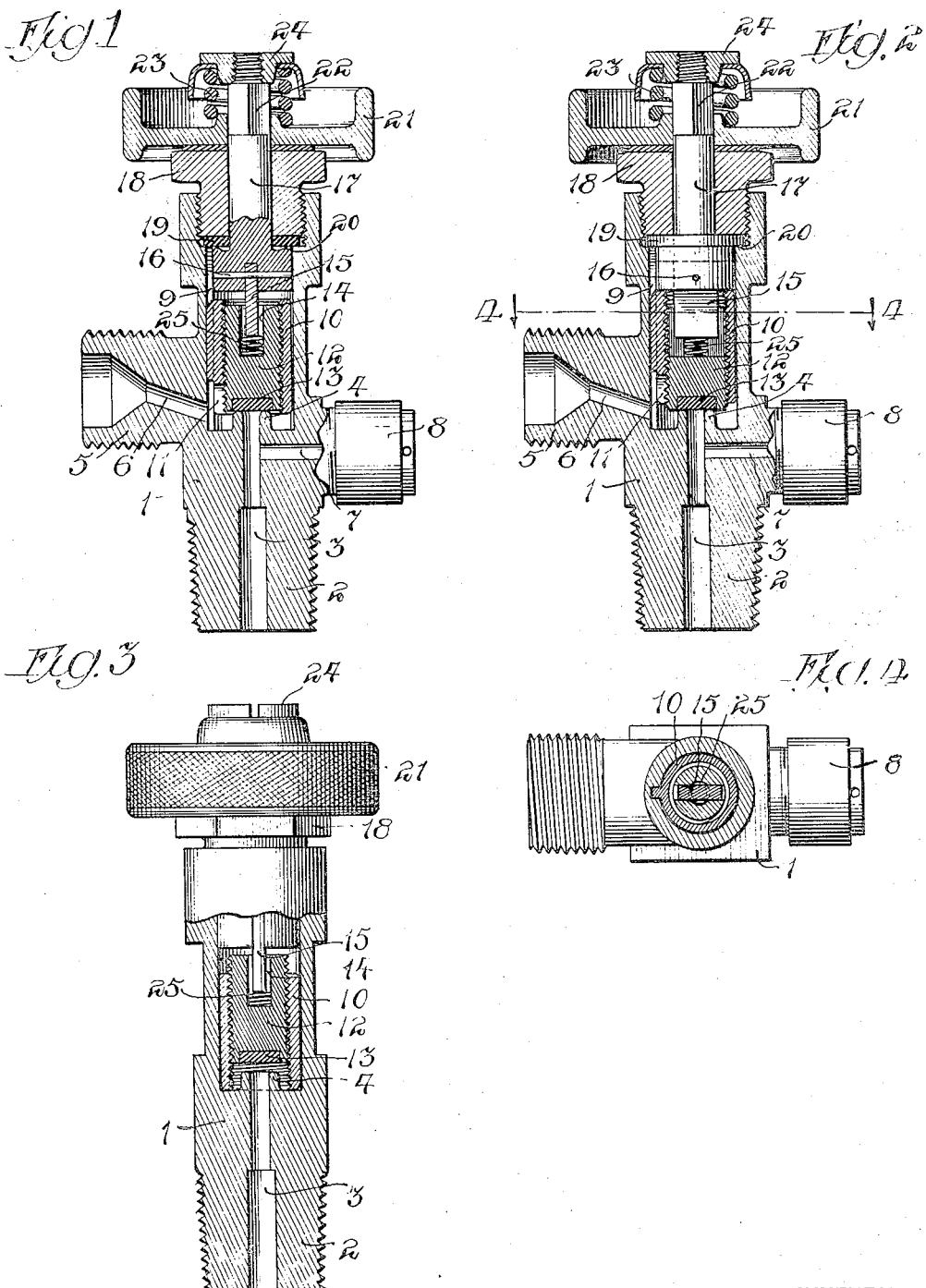

CHARLES L. BASTIAN, OF CHICAGO, ILLINOIS.

VALVE.

1,236,899.	Specification of Letters Patent.	Patented Aug. 14, 1917.

Application filed December 26, 1916. Serial No. 138,863.

*To all whom it may concern:*

Be it known that I, CHARLES L. BASTIAN, a citizen of the United States, residing at Chicago, in the county of Cook and State of Illinois, have invented certain new and useful Improvements in Valves, of which the following is a specification.

This invention relates to a valve embodying means for providing a lost motion and resilient connection between the movable valve member and the valve operating stem so that the seating of the valve member is rendered less abrupt and harsh.

A further object of my invention is the provision of a valve constructed to permit the movement of fluid under pressure in one direction only therethrough when in an intermediate neutral position and capable of actuation to entirely prevent the flow or to permit fluid to pass in either direction therethrough.

Further objects and advantages of my invention will be apparent as it is better understood by reference to the following specification when read in connection with the accompanying drawing, illustrating the preferred embodiments thereof, in which—

Figure 1 is a longitudinal section through the valve, the parts being disposed in intermediate or neutral position;

Fig. 2 is a similar view with the parts disposed in closed position;

Fig. 3 is an elevation, partially in section, of the valve with the parts disposed in open position; and Fig. 4 is a section on the line 4—4 of Fig. 2.

Referring to Figs. 1 to 4, inclusive, of the drawings, 1 indicates the valve casing having a threaded inlet portion 2 and an inlet duct 3 opening to the interior of the casing through the valve seat nipple 4. A threaded outlet portion 5 of the casing 1 is provided with an outlet duct 6 leading to the interior of the casing. A duct 7 connects the inlet duct 3 with a safety device 8 which, however, forms no part of my present invention. The casing 1 is provided interiorly with an integral rib 9 which forms a guide for a sleeve 10 loosely mounted within the casing and interiorly threaded. The sleeve 10 is provided with a notch 11 registering with the outlet duct 6 to permit the passage of fluid from the interior of the casing. Threadedly mounted in the sleeve 10 is a valve plug 12 having a seat member 13, preferably of soft metal, to coöperate with the valve seat nipple 4 and thus close the inlet duct 3. The valve plug 12 is slotted at 14 to receive the flattened key 15 which is secured by a pin 16 to the rotatable stem 17.

The stem 17 is mounted in a nut 18 which threadedly engages and closes the end of the valve casing 1. A fiber washer 19 is disposed between the inner end of the nut 18 and the shoulder 20 on the stem 17. A hand wheel 21 is mounted on the squared end 22 of the stem 17 and is resiliently held against the end of the nut 18 by a spring 23 disposed between the hand wheel 21 and a cap 24 threadedly mounted on the end of the stem 17. A spring 25 is mounted in the bottom of the slot 14 in position to engage the end of the flattened key 15 so that when the parts are in the position indicated in Fig. 1 of the drawing the pressure of the fluid entering through the inlet duct 3 will force the valve plug 12 and the sleeve 10 upwardly, thus permitting the fluid to pass to the outlet duct 6 and thence from the valve. Except when sufficient pressure is exerted through the inlet duct 3 the duct is always closed by the seat member 13 in the valve plug 12 which is resiliently held in closed position by the spring 25. Thus should the pressure in the outlet duct 6 exceed that in the inlet duct 3 no fluid can flow backwardly through the valve. This is of material advantage for example where an inflammable gas, such as acetylene under pressure is connected to the inlet duct 3 and the outlet duct 6 is connected to a gas line into which oxygen under pressure is admitted. Without the provision of means for preventing the backward flow of gas through the valve it has frequently happened that the pressure of the acetylene has fallen below that of the oxygen so that the oxygen passed into the acetylene tank forming an inflammable and explosive mixture. As will be readily appreciated this could not occur with the valve constructed in accordance with my invention.

When it is desired to permanently close the inlet duct 3 the hand wheel 21 is turned to the right until the valve plug 12 and sleeve 10 have moved, respectively, into engagement with the nipple 4 and the end of the stem 17. In this position the valve seat member 13 prevents the escape of fluid from the duct 3. A single turn of the hand wheel 21 to the left is sufficient to permit the valve plug 12 and sleeve 10 enough play to operate as described in the last paragraph. When, however, the hand wheel 21 is given a sufficient number of turns to carry the end of the sleeve 10 into engagement with the interior of the casing 1 adjacent the nipple 4 the valve plug 12 will be moved away from the nipple 4 to permit the passage of fluid in either direction through the valve. This position of the valve may be employed for example when it is desired to fill a tank to which the valve is attached with acetylene or other fluid.

From the foregoing it will be readily understood that I have perfected a simple improvement in valves embodying the use of a loose sleeve longitudinally but not rotatably movable within the valve casing which results in the various advantages set forth herein. In this embodiment of my invention the lost motion and resilient connection provided between the movable valve member and the valve operating stem renders the seating of the movable valve member less abrupt and harsh. The improvement is of such a nature that it does not add materially to the cost of valves in which it is employed and the advantages obtained are of great value as compared with this slight additional expense.

It will be apparent that various changes may be made in the form, construction and arrangement of the parts without departing from the spirit and scope of the invention or sacrificing any of its material advantages, the forms hereinbefore described being merely preferred embodiments thereof.

I claim:

1. In a valve, the combination of a casing providing a chamber, ducts communicating with said chamber, and means for controlling the flow of fluid through said chamber including a valve member adapted to close one of said ducts, a sleeve slidably mounted in said chamber in threaded engagement with said valve member, abutments for limiting movement of said sleeve in either direction, means separate from and loosely engaging said valve member for rotating said valve member and means disposed between the latter and rotating means for resiliently maintaining said valve member in duct-closing position when said sleeve is not engaged with either of said abutments.

2. In a valve, the combination of a casing providing a chamber, an inlet duct leading to said chamber, an outlet duct leading therefrom, and means for controlling the flow of fluid through said chamber including a valve member adapted to close said inlet, a sleeve slidably mounted in said chamber in threaded engagement with said valve member, abutments for limiting movement of said sleeve in either direction, means separate from and loosely engaging said valve member for rotating the latter and a spring disposed between said valve member and rotating means to resiliently maintain said valve in position to close said inlet duct when said sleeve is not engaged with either of said abutments.

3. In a valve, the combination of a casing providing a chamber, an inlet duct leading to said chamber, an outlet duct leading therefrom, and means for controlling the flow of fluid through said chamber including a valve member having a seating portion adapted to close said inlet, a sleeve slidably mounted in said chamber in threaded engagement with said valve member, abutments for limiting movement of said sleeve in either direction, a rotatable stem having means to engage and actuate said valve member, and a spring disposed between said valve member and actuating means to resiliently maintain said valve member in position to close said inlet when said sleeve is not engaged with either of said abutments.

4. In a valve, the combination of a casing providing a chamber, an inlet duct leading to said chamber, an outlet duct leading therefrom, and means for controlling the flow of fluid through said chamber including a valve member having a seating portion adapted to close said inlet, a sleeve slidably mounted in said chamber in threaded engagement with said valve member, a slot in said sleeve registering with said outlet duct, abutments for limiting movement of said sleeve in either direction, a rotatable stem having means to engage and actuate said valve member and a spring disposed between said valve member and actuating means to resiliently maintain said valve member in position to close said inlet when said sleeve is not engaged with either of said abutments.

CHARLES L. BASTIAN.

Witness:
M. A. KIDDIE.